(12) United States Patent
Santos da Silva, Jr. et al.

(10) Patent No.: US 12,737,217 B2
(45) Date of Patent: Sep. 15, 2026

(54) COMPUTING DEVICES TO TRANSFER EXECUTION OF PROCESSES

(71) Applicant: Hewlett-Packard Development Company, L.P., Spring, TX (US)

(72) Inventors: Alexandre Santos da Silva, Jr., Porto Alegre (BR); Lucas Lemos Rosa, Porto Alegre (BR); Fabio Osorio Moreira, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 732 days.

(21) Appl. No.: 18/040,061

(22) PCT Filed: Aug. 28, 2020

(86) PCT No.: PCT/US2020/048377
§ 371 (c)(1),
(2) Date: Jan. 31, 2023

(87) PCT Pub. No.: WO2022/046068
PCT Pub. Date: Mar. 3, 2022

(65) Prior Publication Data
US 2023/0289221 A1 Sep. 14, 2023

(51) Int. Cl.
*G06F 9/48* (2006.01)

(52) U.S. Cl.
CPC .................................. *G06F 9/4881* (2013.01)

(58) Field of Classification Search
CPC ..................................................... G06F 9/4881
See application file for complete search history.

(56) References Cited

U.S. PATENT DOCUMENTS

| | | | | |
|---|---|---|---|---|
| 6,981,040 | B1 * | 12/2005 | Konig | H04L 67/55 |
| 7,320,031 | B2 * | 1/2008 | Konig | H04L 67/55 709/224 |
| 8,200,771 | B2 | 6/2012 | Ganesh et al. | |
| 8,355,709 | B2 * | 1/2013 | Nagaraj | G06F 9/505 455/566 |
| 9,210,213 | B2 | 12/2015 | Momchilov et al. | |
| 9,507,630 | B2 | 11/2016 | Addepalli et al. | |
| 10,015,178 | B2 * | 7/2018 | Schulman | H04L 63/1425 |
| 10,089,259 | B2 * | 10/2018 | Lavasani | G06K 7/00 |
| 10,747,418 | B2 * | 8/2020 | Pieper | H04L 65/80 |

(Continued)

FOREIGN PATENT DOCUMENTS

| | | |
|---|---|---|
| CN | 105144108 A | 12/2015 |
| CN | 108064364 A | 5/2018 |

OTHER PUBLICATIONS

Yang, et al., "Context-Aware Task Offloading for Wearable Devices", IEEE, Jul. 31, 2017, 9 pages.

*Primary Examiner* — Van H Nguyen
(74) *Attorney, Agent, or Firm* — Quarles & Brady LLP

(57) ABSTRACT

An example computing device includes a user input device, a network interface, and a processor connected to the user input device and the network interface. The processor is to execute a process, monitor user input at the user input device to determine user interaction with the process, and, in response to determining a lack of user interaction with the process, provide the process to a remote computing device via the network interface to continue execution of the process by the remote computing device.

18 Claims, 7 Drawing Sheets

(56) References Cited

U.S. PATENT DOCUMENTS

| | | | | |
|---|---|---|---|---|
| 11,682,029 | B2 * | 6/2023 | Sharma | G06Q 30/0203 705/7.29 |
| 2001/0018673 | A1 | 8/2001 | Goldband et al. | |
| 2012/0246107 | A1 | 9/2012 | Beaty et al. | |
| 2013/0073600 | A1 | 3/2013 | Jenkins et al. | |
| 2013/0246926 | A1 | 9/2013 | Vemireddy | |
| 2014/0032761 | A1 | 1/2014 | Beveridge | |
| 2014/0101226 | A1 | 4/2014 | Khandekar et al. | |
| 2015/0326690 | A1 | 11/2015 | Momchilov et al. | |
| 2016/0139948 | A1 | 5/2016 | Beveridge et al. | |
| 2016/0217615 | A1 | 7/2016 | Kraver | |
| 2017/0024100 | A1 * | 1/2017 | Pieper | H04L 12/1827 |
| 2017/0034193 | A1 * | 2/2017 | Schulman | H04L 63/1416 |
| 2018/0288137 | A1 | 10/2018 | Veeramani et al. | |
| 2020/0142753 | A1 | 5/2020 | Harwood et al. | |

* cited by examiner

COMPUTING DEVICES TO TRANSFER EXECUTION OF PROCESSES

BACKGROUND

Computing devices may execute processes to enable user applications. Applications may serve various computationally intensive tasks, such as video editing, modeling, simulation, and the like. A computing device's computational resources, such as its processor and memory, may dictate the effectiveness of execution of a particular application or process.

DETAILED DESCRIPTION

Execution of a process or application may be transferred from one computing device to another computing device that may provide more suitable computational resources for the process or application. For example, for a resource intensive task, a user's local computer may be insufficient, so a process may be transferred to a remote workstation that has greater capabilities or capacity.

Transfer may be performed seamlessly so that the user is unlikely to be aware of the transfer. Hence, the transfer of the process is made when it is determined that the user is not paying attention to the process or the relevant application. For example, transfer may be performed when the application is minimized (i.e. when the application is collapsed to the taskbar) or when the user has stepped away from the computer. A local viewport (window) of the process may be swapped for a viewport to the remote process, so that the user may not notice the transfer of execution to the remote device.

A machine learning model may be used to determine whether or not the user is paying attention and, thus, whether or not the process can be transferred to a remote device. Monitoring may be performed with an input device, such as a mouse, keyboard, camera, microphone, etc. Monitoring may reference an application focus, as determined with an operating system. User interaction and application focus may be taken as indicative of whether or not the user is given the application attention.

Transfer of a process between various computing devices may allow for the process to be completed in a reduced amount of time. When this is done without alerting the user, the user may perceive increased performance.

Figure 1:
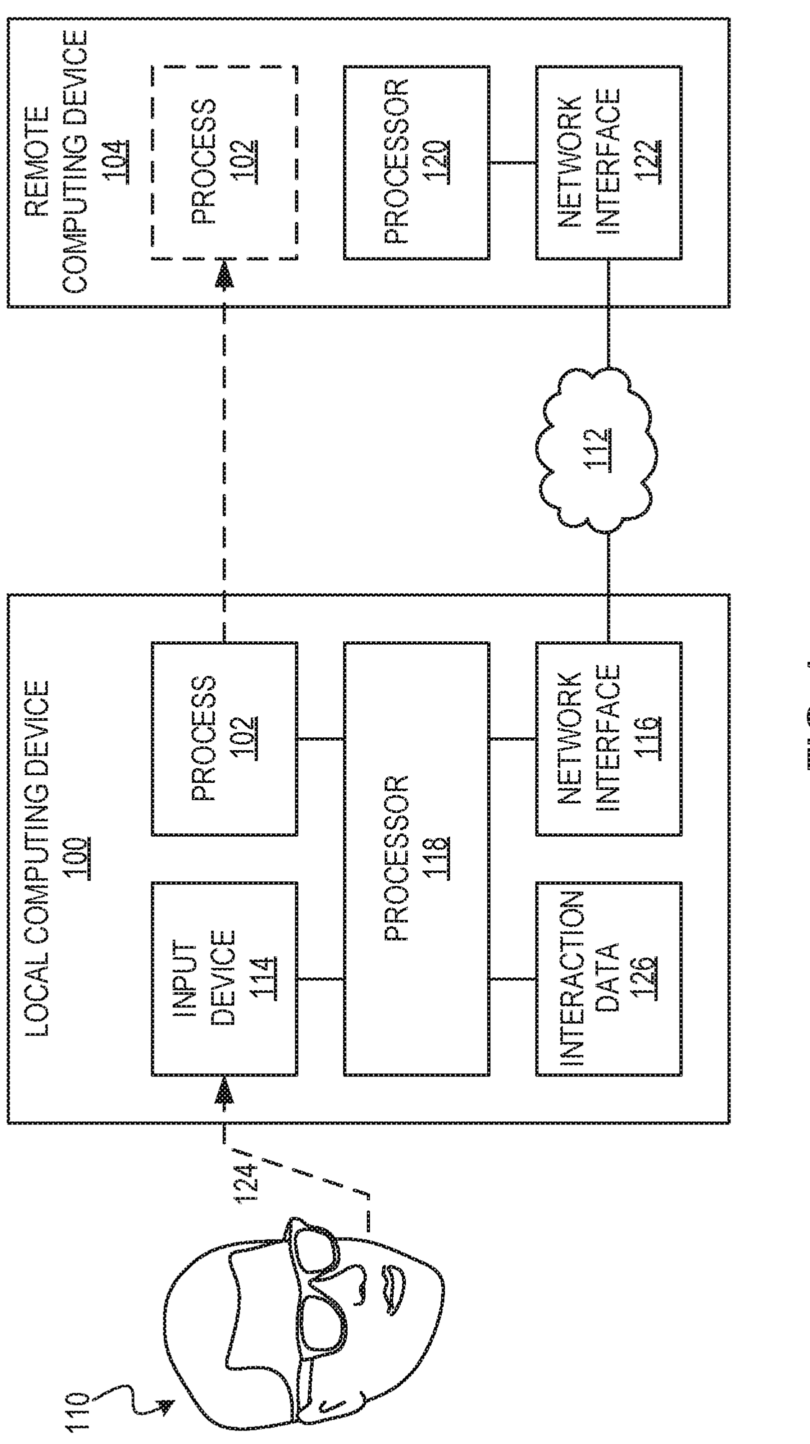
FIG. 1 is a block diagram of an example computing device to provide a process to a remote computing device in response to a lack of user interaction with the process at the example computing device.

FIG. 1 shows an example computing device 100 that executes a process 102 and provides the process 102 to a remote computing device 104 in response to a lack of user interaction 106 with the process 102 at the computing device 100. This may allow for execution of the process 102 to be transferred to the remote computing device 104 with the user of the computing device 100 kept unaware of the transfer, since even a small disruption in the process 102 may be noticeable and undesirable. Further, the remote computing device 104 may be selected to provide better suited resources for the process 102. In some examples, the lack of suitable resources at the computing device 100 may trigger the transfer of the process 102, as contingent on the user's attention being elsewhere. As such, a task may be offloaded to a better suited device without disrupting the user.

The computing device 100 may be a desktop computer, an all-in-one (AIO) computer, a notebook computer, a tablet computer, a smartphone, or similar computing device. The computing device 100 may be considered a local computing device as a user 110 is present at the computing device 100. The remote computing device 104 may be a workstation, a server, a desktop computer, or similar computing device. The remote computing device 104 may share its computational resources with various users. In the examples discussed herein, the remote computing device 104 is accessed via a computer network 112 and not accessed directly by a user interface. In other examples, the remote computing device 104 includes a user interface and supports direct access by a user.

The computing device 100 includes a user input device 114, a network interface 116, and a processor 118 connected to the user input device 114 and the network interface 116. The computing device 100 may include other components, such as a display device, non-transitory computer readable medium, a speaker, a power supply, a housing, and the like.

The user input device 114 accepts user input 124 and provides a representation of such input to the processor 118. The user input device 114 may include a keyboard, button, mouse, trackpad, microphone, camera, proximity sensor, and similar devices capable of capturing input from a user of the computing device 100. Any number and type of user input devices 114 may be used.

User input 124 may be active or passive. Examples of active input include a keypress, a mouse movement, and a selection of an application to bring the application into focus whether by mouse click, keyboard shortcut, or similar input. Examples of passive input include camera image capture, camera video capture, proximity sensing, and microphone audio capture. A given user input 124 may be passive, active, or a combination of such. An example combination input is a user speaking a voice command to turn on a microphone for audio capture.

The network interface 116 includes hardware, such as a network adaptor card, network interface controller, or network-capable chipset, and may further include instructions, such as a driver and/or firmware. The network interface 116 allows data to be communicated with the computer network 112, which may include a local-area network (LAN), widearea network (WAN), virtual private network (VPN), the internet, or similar networks that may include wired and/or wireless pathways.

Communication between the computing device 100 and the remote computing device 104 may be made via the computer network 112 and respective network interfaces of such devices 100 and/or 104.

The processor 118 may include a central processing unit (CPU), a microcontroller, a microprocessor, a processing core, a field-programmable gate array (FPGA), an application-specific integrated circuit (ASIC), or a similar device capable of executing instructions. The processor 118 may cooperate with a non-transitory machine-readable medium, which may include an electronic, magnetic, optical, or other physical storage device that encodes instructions.

The machine-readable medium may include, for example, random access memory (RAM), read-only memory (ROM), electrically-erasable programmable read-only memory (EEPROM), flash memory, a storage drive, an optical device, or similar.

The instructions may be directly executed, such as a binary file, and/or may include interpretable code, bytecode, source code, or similar instructions that may undergo additional processing to be executed. All of such examples may be considered executable instructions.

The processor 118 executes the process 102. The process 102 may be one of several processes that provides an application or may be the sole process of an application. Examples of applications include applications that perform resource-intensive tasks, such as video editing, video encoding, computer-aided design (CAD), three-dimensional (3D) modeling, artificial-intelligence (AI), simulation (e.g., scientific, financial, meteorological, climate, etc.), compression/decompression, encryption/decryption, data mining, and so on. Resource-intensive tasks may be made more efficient with specific hardware resources, such as a high-performance CPU, large amounts of memory, a large storage drive, a graphics processing unit (GPU), and similar.

The remote computing device 104 may include similar components to the computing device 100, such as a processor 120 and network interface 122. The remote computing device 104 may include resources better suited to execution of the process 102, such as discussed above. For example, the remote computing device 104 may include a GPU, while the local computing device may lack a GPU or contain a lower-performance GPU.

The process 102 may include an instance of an executable program (e.g., an image of machine code), data used by the program (e.g., variables, counters, a region of virtual memory, a data file, etc.), a call stack, a heap, operating system descriptors or handles of resources that are allocated to the process, security attributes (e.g., process owner, process permissions, etc.), and process state or context, such as the content of registers and physical memory addressing. The process 102 may exist in memory (e.g., RAM, registers, etc.) or memory and persistent storage (e.g., RAM and a swap file). Regardless of the specific aspects of the process 102 and their locations at a given point in execution, the process 102 can be considered the totality of the above-mentioned aspects, if used by the process 102. As such, the process 102 may be replicated in its entirety at a different computing device by copying the aspects used. In some examples, all aspects of the process 102 are copied. In other examples, data of the process 102 is copied via an application programming interface (API) for example.

While the processor 118 executes the process 102, the processor 118 monitors user input 124 at the input device 114 to determine user interaction with the process 102, if any. Examples of user interaction include a keypress associated with the process 102, a mouse movement in a window that is controlled by the process 102, pressing a virtual button associated with the process 102, the user looking at the screen while a window that is controlled by the process 102 is visible, a sound made by the as captured by a microphone while a window that is controlled by the process 102 is visible, and similar.

In various examples, user interaction may be determined based on whether or not the application to which the process 102 belongs has focus in the sense that the operating system routes user input 124 to the application. If the application has focus, the user may be considered to be interacting with the application. If the application lacks focus, the user may be considered to be not interacting with the application.

A lack of user interaction may be no interaction, a reduced amount of interaction as compared to expected interaction, insufficient user interaction for the process to proceed, an absence of focus to the application, and similar. Examples of such include the user 110 leaving the vicinity of the computing device 100 as detected by a camera, the user 110 minimizing a window controlled by the process 102, the user 110 stopping movement of the mouse in a window controlled by the process 102, a window of another process fully or partially occluding a window controlled by the process 102, the user 110 failing to respond to a dialog box within a certain amount of time, the user 110 looking away from a window controlled by the process 102 or looking away from a display screen, and similar.

The processor 118 may apply a machine-learning model to monitor user input 124 and determine a lack of user interaction with the process 102. The machine-learning model may be trained based on a training dataset of various user inputs at various user input devices with indications of whether or not the user was interacting with a process. An example of a suitable machine-learning model includes a convolutional neural network (CNN).

Additionally or alternatively, the processor 118 may apply a deterministic model that includes rules that map user input 124 to an indication of user interaction. Such a model may include any number of rules. An example rule is no mouse moment for a predetermined period of time (e.g., 5 seconds) and the user is looking away from the screen, as determined by a webcam with an eye-tracker program. If such a rule is satisfied, then a lack of interaction with the processor 102 is determined. Another example rule is another window occluding at least a predetermined proportion (e.g., 80%) of the process window for a predetermined time (e.g., 10 seconds).

Determined user interaction may be stored at the local computing device 100 as user interaction data 126. User interaction data 126 may be considered indicative of user attention to the process 102. If the user 110 is interacting with the process 102, as indicated by the interaction data 126, then the user 110 is considered to be paying attention to the process 102. Conversely, if the user 110 is not interacting with the process 102, as indicated by the interaction data 126, then the user 110 is considered to not be paying attention to the process 102.

In response to determining a lack of user interaction with the process 102, and thus inferring a lack of attention to the process 102, the processor 118 provides the process 102 to a remote computing device 104 via the network interface 116 to continue execution of the process 102 by the remote computing device 104. This may allow the computing device 100 to offload a task to a remote computing device 104. Further, the remote computing device 104 may have resources that better match the task than the resources of the computing device 100. For example, the process 102 may be a CAD application and the computing device 100 may lack a GPU, whereas the remote computing device 104 may include a GPU. As such, a resource-intensive task may be offloaded to a more suitably equipped computing device 104. Further, a suitable target computing device 104 may be selected from a plurality of computing device 104 based on a matching of resources available to resources demanded by the process 102.

As a condition to provide the process 102 to the remote computing device 104, in addition to the lack of user attention to the process 102, the processor 118 may also determine that the process 102 uses an excessive amount of resources of the computing device 100. An excessive amount of resources may be quantified as a portion of CPU cycles, a portion of memory, or a portion of network bandwidth that exceeds a respective threshold amount. For example, the process 102 using greater than 50% CPU capacity and greater than 50% memory capacity may be considered to use an excessive amount of resources. In another example, a process 102 that uses greater than 75% CPU capacity or greater than 75% memory capacity may be considered to use an excessive amount of resources.

The viewport (e.g., window) of the process 102 as executed at the computing device 100 may be swapped for a viewport that outputs results of the process 102 as executed by the remote computing device 104. The viewport maybe swapped seamlessly, for example, by opening a new viewport at the location of the existing viewport and then closing the existing viewport. Results may be streamed from the remote computing device 104 to a viewport at the computing device 100. Likewise, user input at such a viewport may be streamed to the remote computing device 104 for consumption by the process 102. Remote desktop techniques or input/output streaming techniques may be used.

The process 102 may be returned to the computing device 100 a manner similar to as discussed above. If the user 110 is again inattentive to the process 102, the process 102 may be transferred from the remote computing device 104 back to the user's computing device 100. The return transfer may also be contingent on a determination that local execution would consume an acceptable amount of local computational resources of the computing device 100. In addition or alternatively, transfer of the process 102 back to the local computing device 100 may be done if latency of the computer network 112 increases to a degree that providing results of the remote-execute process 102 to the computing device 100 becomes inefficient. For example, if network latency increases significantly, the user 110 may notice that the viewport of the remote-executed process 102 does not update at the expected rate.

The process 102 may be transferred between the computing devices 100, 104 based on available computation resources to execute the process 102 effectively, and the transfer may be carried out based on user attention to the process 102, such that the transfer occurs seamlessly and alerting the user 110 to the transfer is avoided. As such, interruption of the user may be avoided.

Figure 2:
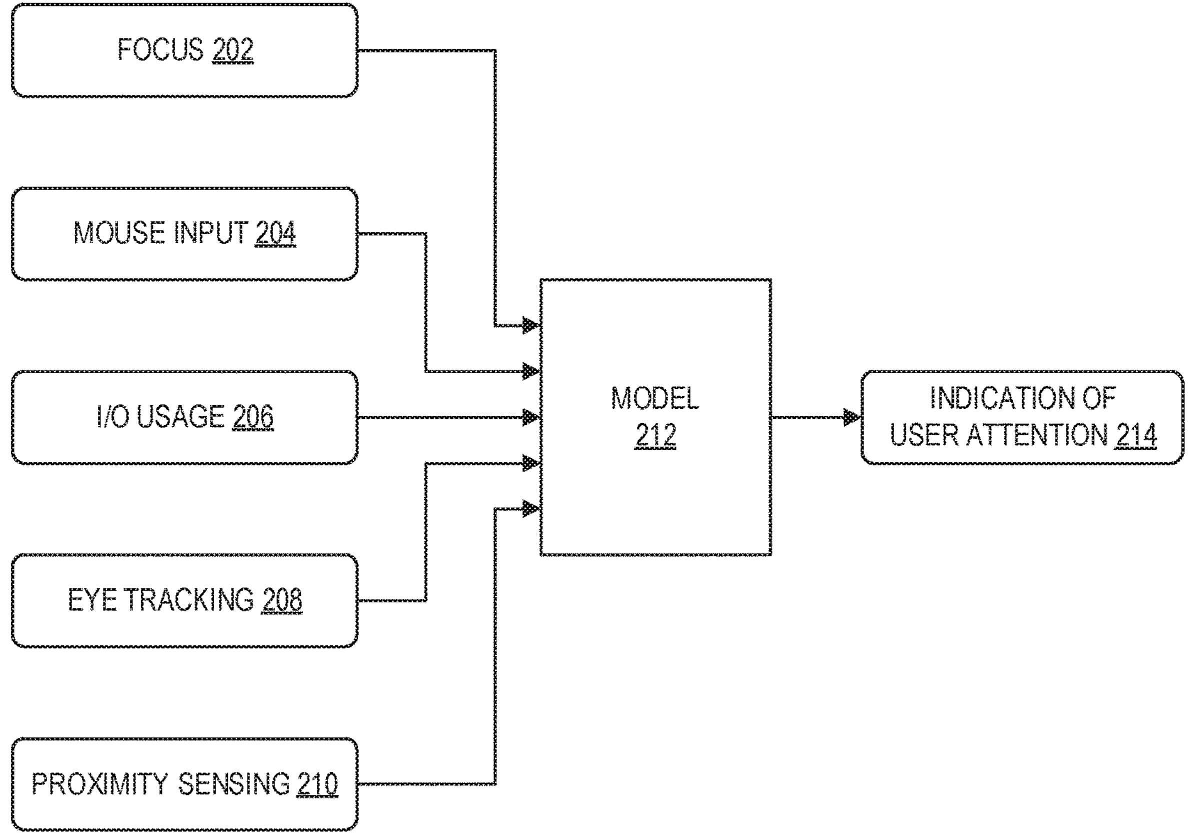
FIG. 2 is a block diagram of example inputs to and example model to monitor user attention to a process.

FIG. 2 shoes example inputs 202-208 that may be applied to an example model 212 to determine an indication of user attention 214 to a process.

The inputs 202-208 may include an application focus 202, mouse input 204, input/output (I/O) usage 206, eye tracking 208, and proximity sensing 210. These inputs 202-208 may be provided alone or in various combinations. Other inputs may also be provided.

Application focus 202 is an operating system responsibility that handles how input is directed to applications. Keystrokes, for example, may only be provided to the one application that has focus. An application that has focus is often within the user's attention. An application that is out of focus or minimized is often outside of the user's attention.

Mouse input 204 may include mouse pointer position that may be monitored. It may be the case that the user is not directly interacting with the application using keystrokes and mouse clicks, but may still be paying attention to the application as may be indicated by mouse movement. For example, a user may read a passage of text and move a mouse pointer to help guide the reading process. Hence, even when an application lacks operating system focus, a user may still be interacting with the application as indicated by mouse movement.

I/O usage 206 may identify applications that are listening or publishing to local I/O streams, such as sound, image, video, printing, scanning, and the like. An application that lacks focus may still have the user's attention when using VO resources. For instance, an application that plays music may run in the background without direct user interaction, and may still be subject to the user's attention. Hence, an application that is using an I/O device, such as a microphone, speaker, printer, scanners, webcam, or similar, may be considered to have the user's attention.

Eye tracking 208 may use a camera or other device to determine whether the user is looking at the screen or looking away. If the computing device includes multiple display devices, eye tracking 208 may determine which display device has the user's attention. The display device that contains an application's window may be determined from the operating system and, hence, eye tracking 208 may be used to identify applications that may or may not be subject to the user's attention.

Proximity sensing 210 may be performed using a proximity sensor, such as an infra-red sensor or camera. Proximity sensing 210 may detect the presence of the user in front of the computing device. A user who is no proximate may be considered to not be paying attention to an application.

One input 202-208 alone may not be able to determine user attention with sufficient accuracy. Hence, a plurality of inputs 202-208, if available, may be considered.

The model 212 receives the inputs 202-208, processes the inputs 202-208, and outputs a result that is an indication of user attention 214 to a process. The model 212 may include a trained machine-learning model, deterministic model, or a combination of such. Examples of these have been given above.

The indication of user attention 214 may be a confidence value, for example, 0 to 1. Zero may indicate virtual certainty that the user is not paying attention to an application, while 1 may indicate virtual certainty that the user is paying attention to the application. The lower an indication of user attention 214, the more likely an application or process thereof can be offloaded to a remote computing device without attracting notice of the user.

The inputs 202-208, the model 212, and the resulting indication of user attention 214 may be applied independently to each process or application when more than one is running.

The model 212 may be trained at intervals or in response to feedback. As such, the model 212 may adapt to predict user behavior. For example, a user may have a routine that the model 212 can learn. For instance, a particular user might often open an email application first thing in the morning and then be inattentive while having coffee for 15 minutes. This kind of behavior can be learned by the model by providing feedback or additional training. The model 212 may prompt the user to confirm whether or not they are paying attention. User responding to such prompts may be used to modify factors in a deterministic model or train a machine-learning model.

Figure 3:
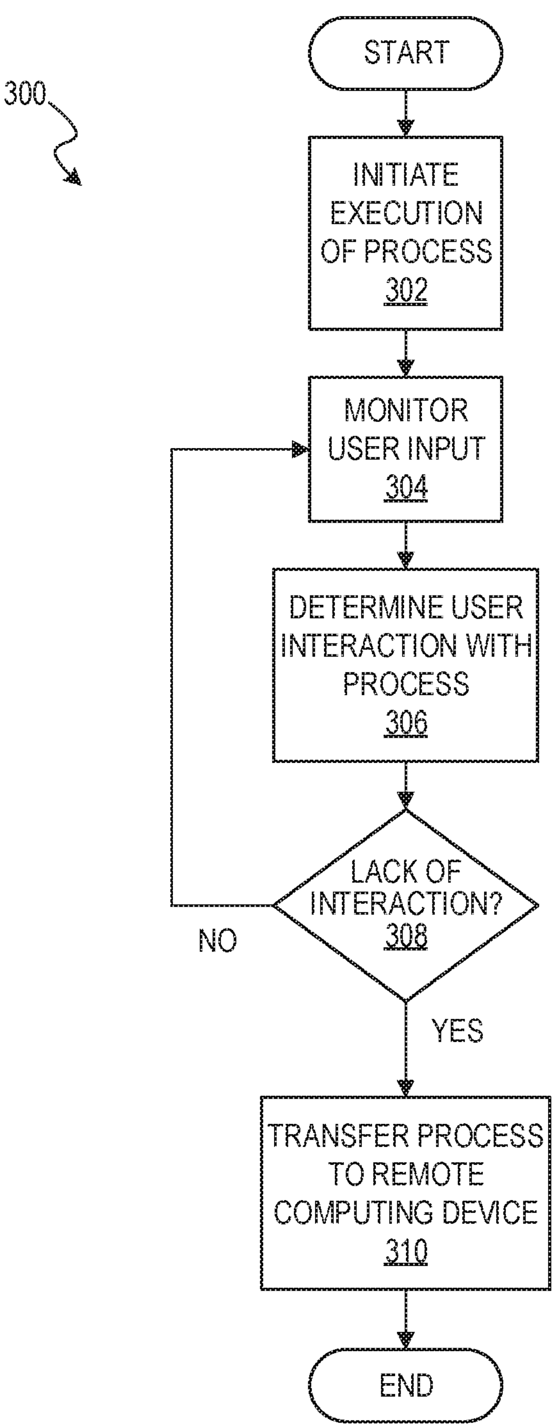
FIG. 3 is a flowchart of an example method of transferring execution of a process to a remote computing device in response to lack of user interaction with the process at a local computing device.

FIG. 3 shows an example method 300 of transferring execution of a process based on a lack of user attention. The method 300 may be implemented with instructions that may be stored in non-transitory machine-readable media and executed by a processor. Detail concerning elements of the method 300 described elsewhere herein will not be repeated at length below; the relevant description provided elsewhere herein may be referenced for elements identified by like terminology or reference numerals.

At block 302, local execution of a process is initiated at a local computing device. This may include a user launching an application.

At block 304, user input is monitored. A user input device may be monitored for input, whether active or passive. Examples of user input devices and inputs that may be monitored have been given above. Application focus, as may be determined by user input (e.g., selecting an application window), may be monitored.

At block 306, user interaction with the process with the process is determined based on the monitored input. This may include applying a model, such as a machine learning model, to the input.

At block 308, it is determined whether there is a lack of user interaction with the process. This may include comparing a quantitative indication of user input (e.g., 0 to 1) with a threshold level of user input (e.g., 0.25) that indicates a minimum level of attention of the user toward the process. If the interaction is low, then the user is presumed to not be paying attention to the process.

If user interaction is determined to be lacking, then the process is provided to a remote computing device to continue execution of the process by the remote computing device, at block 310.

If user interaction indicates user attention, at block 310, then the process is not transferred to the remote computing device to avoid a perceived disruption in the process. The method 300 may be repeated from block 304. The method 300 may be performed continually for any suitable number of processes or applications, so as to offload processing to a remote computing device when there is little or no chance of the user noticing.

Figure 4:
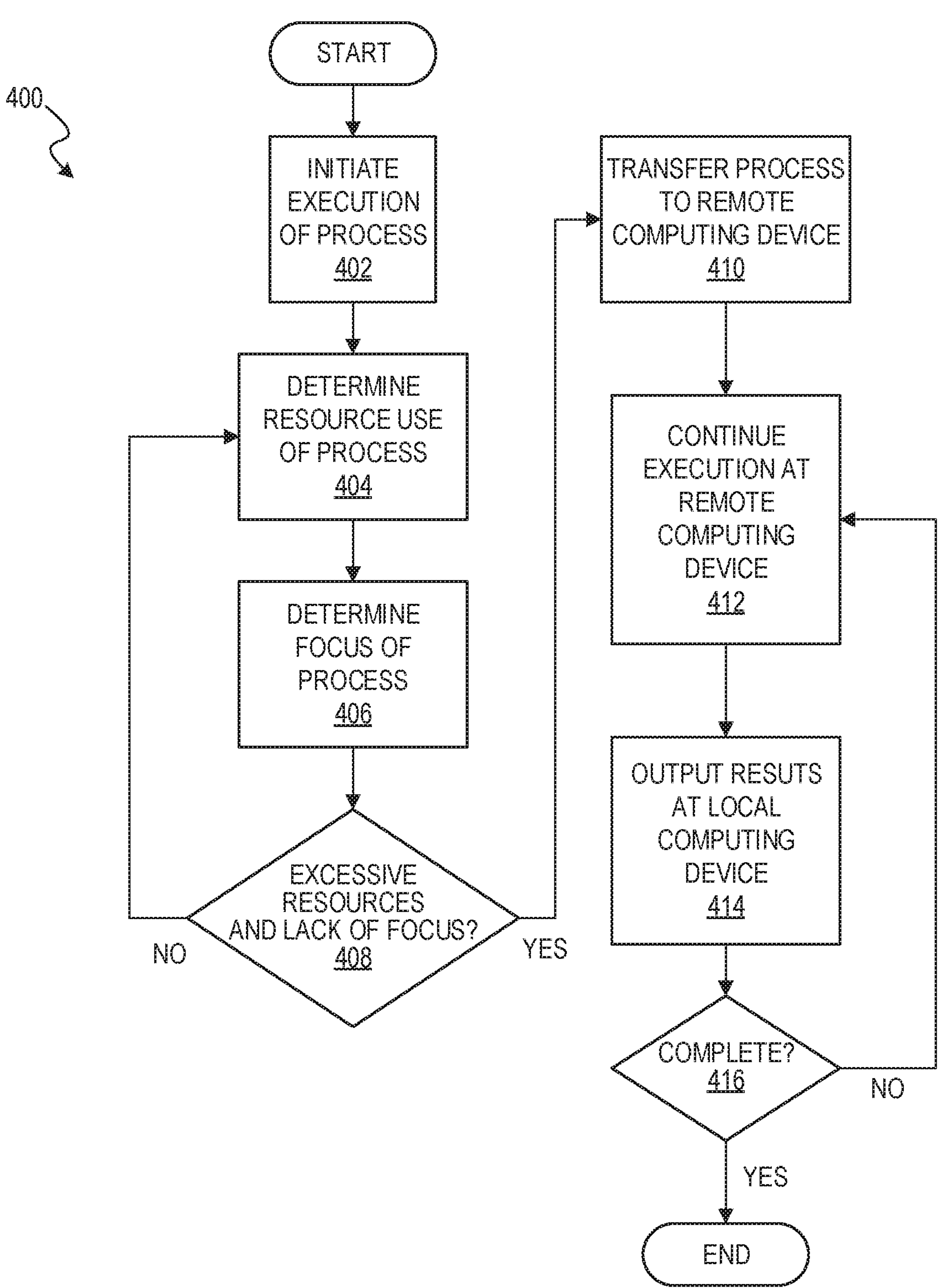
FIG. 4 is a flowchart of an example method of transferring execution of a process to a remote computing device based on resource consumption and capacity and based on user interaction with the process.

FIG. 4 shows an example method 400 of transferring execution of a process to a more-capable remote computing device. The method 400 may be implemented with instructions that may be stored in non-transitory machine-readable media and executed by a processor. Detail concerning elements of the method 400 described elsewhere herein will not be repeated at length below; the relevant description provided elsewhere herein may be referenced for elements identified by like terminology or reference numerals.

At block 402, local execution of a process is initiated at a local computing device. This may include a user launching an application.

At block 404, an amount of computational resources the process consumes is determined. This may include monitoring CPU and memory activity of the process, as discussed elsewhere herein.

At block 406, a focus of the process is determined as an indicator of user attention. This may include determining whether an application to which the process belongs has focus from the operating system. Block 406 may further include determining other indications of user attention, such as input device usage, I/O usage, and similar, as discussed elsewhere herein.

At block 408, it is determined whether local execution consumes an unacceptable amount of computational resources and whether the process lacks focus. Resource consumption may be compared to a threshold acceptable amount. Lack of focus may be determined by comparing a quantification of focus to a threshold value. If both resource consumption is excessive and the process lacks focus, then execution of the process is transferred to a remote computing device, at block 410, for remote execution of the process. Otherwise, local execution continues and the method 400 returns to block 404.

The remote computing device includes greater computational resources than the local computing device. Hence, continued execution of the process, at block 412, is more efficient.

At block 414, results of the remote execution of the process are outputted at the local computing device. This may include the remote computing device sending results, such as user interface content, to the local computing device for display.

The local computing device may receive output of the process from the remote computing device via a computer network and open a new viewport to display the output received. The new viewport may be opened at the same display location as the existing viewport that is assigned to the process as executed by the local computing device. For example, if the existing window for the locally executed process has an X-Y position and a width and a height, then the new window opened for the remotely executed instance of the process is provided with the same X-Y position, width, and height. The existing viewport may be closed, so that one viewport exists for the process.

Execution of the process continues, at blocks 412, 414, until the process is complete, via block 416, and the method 400 ends.

Figure 5:
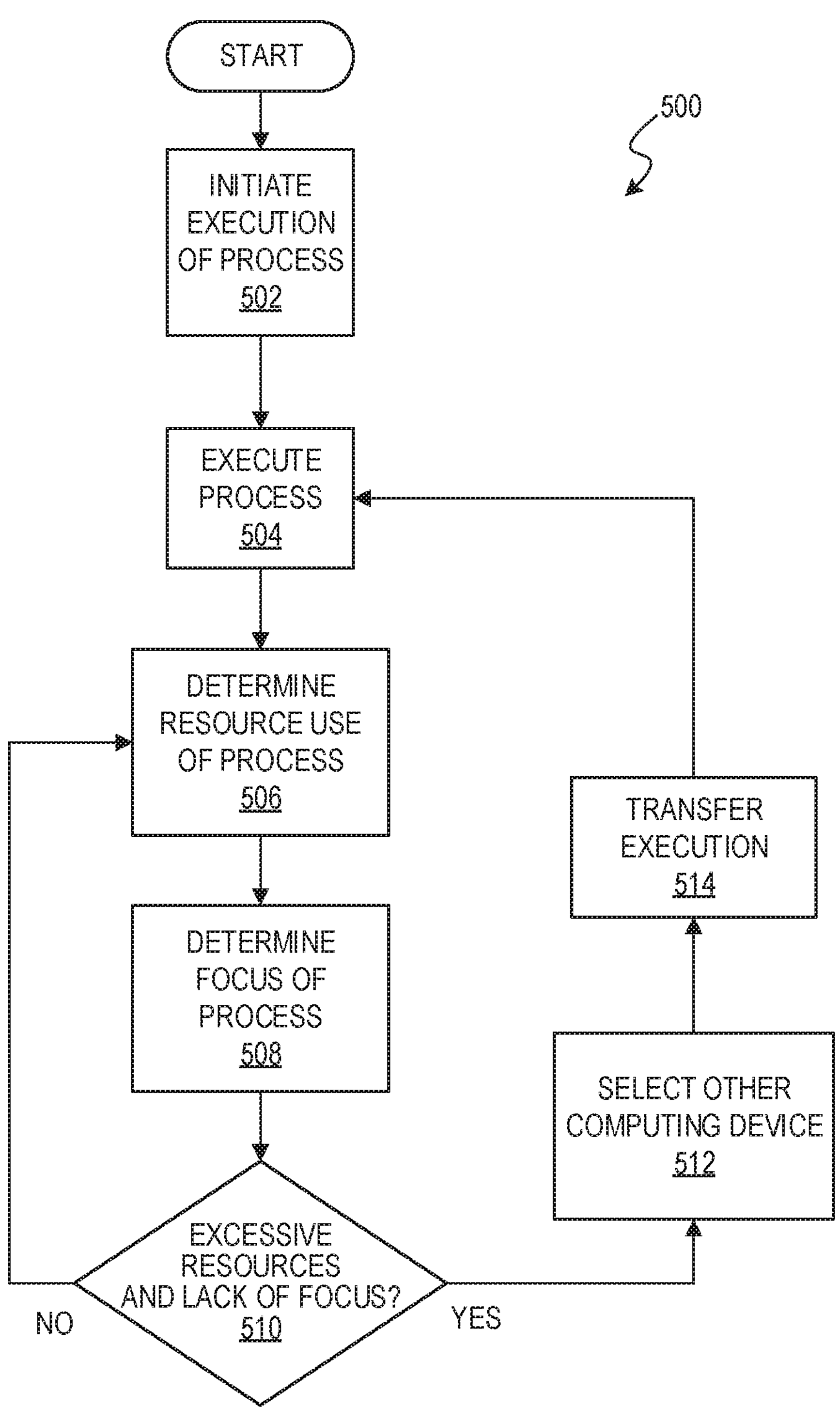
FIG. 5 is a flowchart of an example method of transferring execution of a process between a local computing device and a remote computing device.

FIG. 5 shows an example method 500 of transferring execution of a process between local and remote computing devices. The method 500 may be implemented with instructions that may be stored in non-transitory machine-readable media and executed by a processor. Detail concerning elements of the method 500 described elsewhere herein will not be repeated at length below; the relevant description provided elsewhere herein may be referenced for elements identified by like terminology or reference numerals.

At block 502, local execution of a process is initiated, as may be triggered by a user launching an application. Execution may be initiated at the local or remote computing device. For example, the process may be initiated at the last computing device that executed the process during a previous execution. That is, if execution was previously transferred to the remote computing device, then a subsequent execution may start at the remote computing device without initially monitoring user focus for user inattention. If execution was most recently performed at the local computing device, then execution may start at the local computing device.

At block 504, the process is executed and output is provided to a respective viewport. If the process is executed locally, then the viewport may include a window that is controlled by the process. If the process is executed remotely, then the viewport may include a window that streams results from the remote process and that streams user input to the remote computing device.

At block 506, an amount of computational resources the process consumes is determined. This may include monitoring CPU and memory activity of the process, as discussed elsewhere herein, at whichever computing device presently executes the process.

At block 508, a focus of the process is determined as an indicator of user attention. This may include determining whether an application to which the process belongs has focus from the operating system. Block 506 may further include determining other indications of user attention, such as input device usage, I/O usage, and similar, as discussed elsewhere herein. The determination of focus may be determined with regard to the respective viewport, whether the viewport outputs results of local execution or results of remote execution.

At block 510, it is determined whether execution consumes an unacceptable amount of computational resources at the computing device performing the execution and whether the process lacks focus. Resource consumption may be compared to a threshold acceptable amount. Lack of focus may be determined by comparing a quantification of focus to a threshold value. If both resource consumption is excessive and the process lacks focus, then execution of the process is transferred to another computing device, at block 510, for continued execution of the process. Otherwise, execution at the present computing device continues and the method 500 returns to block 504.

At block 512, a suitable computing device is selected for transfer of execution of the process. If the process is presently executed by the remote computing device, then the local computing device may be selected. If the process is presently executed by the local computing device, then the remote computing device may be selected. If multiple remote computing devices are available, then a particular remote computing device may be selected.

In examples with multiple remote computing devices, a pool of possible computing devices may include the local computing device and the multiple remote computing devices. The pool of acceptable candidates may be reduced based on various criteria, such as computing device capabilities, computing device computational load (present and historic) when computational resources are shared among various users, the process's target resource allocation, an expected duration of execution of the process, network latency and other characteristics, and similar criteria. The pool may be reduced until a suitable computing device is identified for continued execution of the process, particularly with regard to a target resource allocation for the process. That is, if the process would benefit from a large amount of RAM or a GPU, then such a criterion may be weighted heavily. For example, a computing device with low load may be selected, so that a process that requires substantial computational resources may be assigned such resources.

At block 514, execution is transferred to the selected computing device. Execution then continues at such device, at block 504, with process results and user input being streamed with the local computing device, if the selected computing device is remote.

Figure 6:
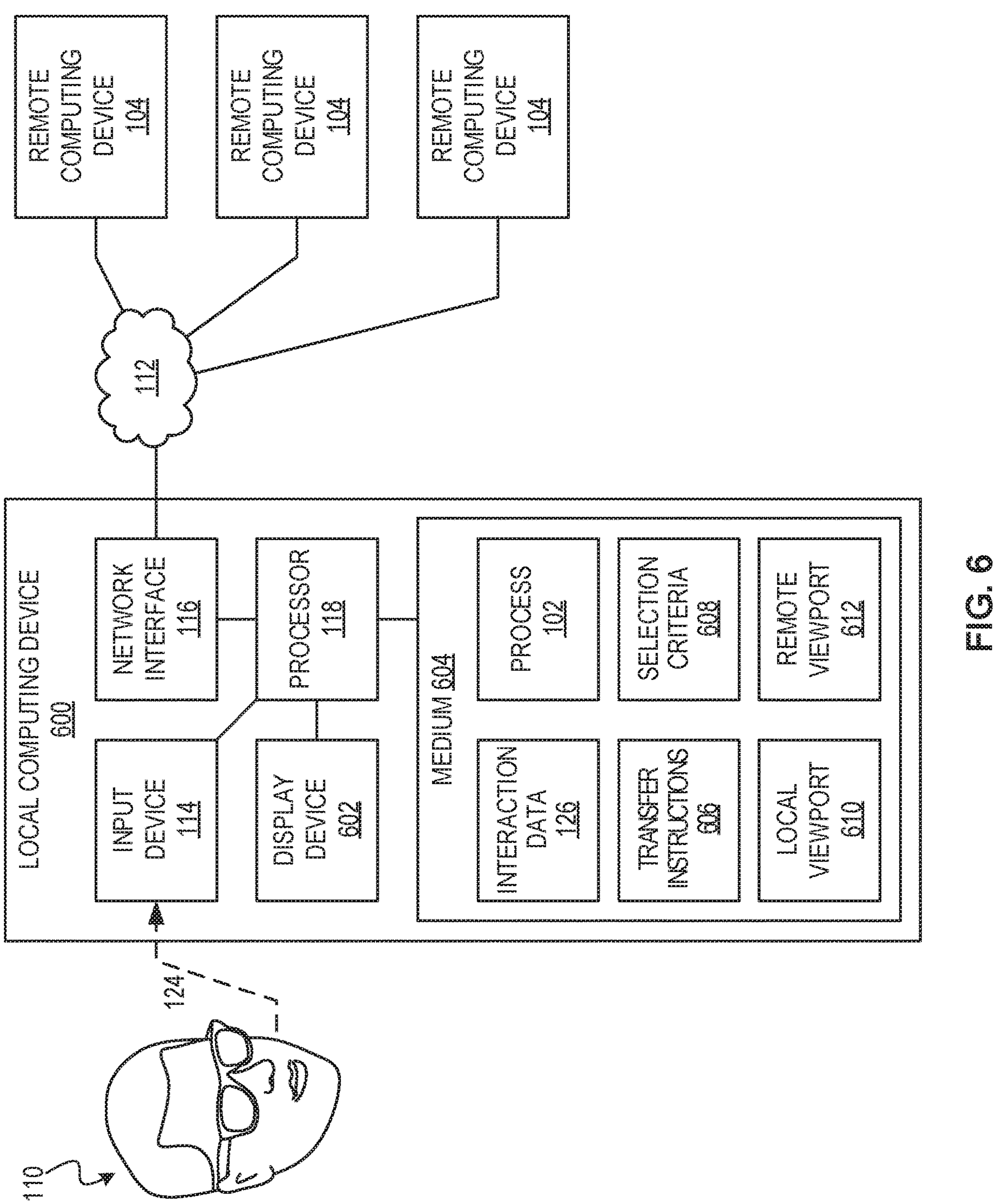
FIG. 6 is a block diagram of an example computing device to provide a process to a selected remote computing device in response to a lack of user interaction with the process.

FIG. 6 shows an example computing device 600 to select a remote computing device 104 for transfer of execution of a process. The device 600 is similar to the device 100, unless otherwise discussed. Detail concerning elements of the device 600 described elsewhere herein will not be repeated at length below; the relevant description provided elsewhere herein may be referenced for elements identified by like terminology or reference numerals.

The computing device 600 includes a processor 118, network interface 116, input device 114, and display device 602. The computing device 600 further includes a non-transitory computer-readable medium 604 that stores instructions and data to carry out the functionality discussed herein. The medium may include RAM, persistent storage, registers, and similar, as discussed elsewhere herein.

The medium 604 may store aspects of a process 102 that may undergo local execution by the processor 118 and remote execution by a remote computing device 104.

The medium 604 may store interaction data 126 such as an indication of a focus of an application to which the process 102 belongs and information captured by the user input device 114.

The medium 604 may further store transfer instructions 606 that transfer the process 102 to a remote computing device 104 for continued execution when it is determined that the user 110 is not interacting with (i.e., not paying attention to) the process 102. Further, the transfer instructions 606 may consider excessive resource demand at the local computing device 600 when determining that the process 102 is to be transferred. The instructions 606 may further transfer execution back to the local computing device 600 or among different remote computing devices 104 in response to performance, such as resource usage and network latency.

The transfer instructions 606 may reference selection criteria that may be stored in the medium 604. Selection criteria 606 may include a target resource allocation for the process 102 or application that the process 102 enabled. A target resource allocation may indicate an ideal set of resources for the process, such as an amount of RAM, an amount of CPU cycles, a number of CPU cores, a GPU, and similar.

Selection criteria 606 may additionally include capabilities of the remote computing devices 104, such as hardware resources (e.g., RAM installed, GPU present or not, etc.) and computational load (present and historic), as discussed elsewhere herein.

Selection criteria 606 may additionally include performance information of the computer network 112 that connects the computing devices 600, 104, such as latency data.

The transfer instructions 606 may thus reference the selection criteria 606 to select a suitable computing device 600, 104 for execution of the process 102. The transfer instructions 606 may thus carry out the transfer of the process 102, as determined.

The medium 604 may further store data for a local viewport 610 and a remote viewport 612. A local viewport 610 may be controlled by the process 102 as executed by the local computing device 600. A remote viewport 612 may be used to stream results and user input with a remote computing device 104 at which the process 102 is executed. The remote viewport 612 may replace output of the process 102 or the enabled application, as would be executed by the processor 118, with output received from a remote computing device 104 when execution is offloaded to a remote computing device 104. For example, the local viewport 610 may be active when the processor 118 executes the process 102. The local viewport 610 may be deactivated and the remote viewport 612 may be activated when execution is transferred to a remote computing device 104. If execution is transferred back to the local computing device 600, then local viewport 610 may be activated and the remote viewport 612 may be deactivated. The viewports 610, 612 may be coincident on the display device 602, so as to provide a seamless transition from the perspective of the user 110.

Figure 7A:
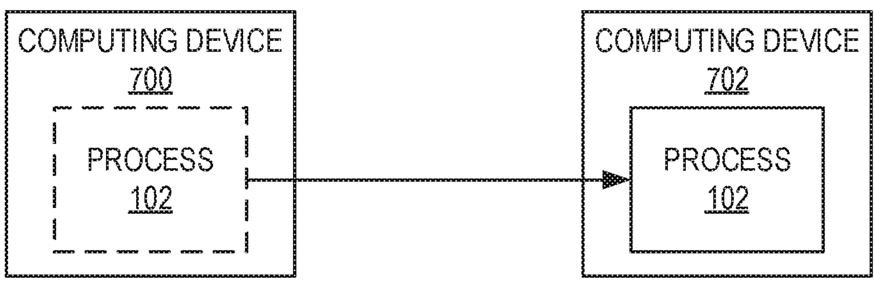
FIG. 7A is a schematic diagram of an example transfer of execution of a process between computing devices.

With reference to FIG. 7A, a process 102 may be transferred it its entirety between computing devices 700, 702. All aspects of the process, such as the process's binary image in memory, and the process's data, stack, and register contents may be assembled into a file and transferred from one computing device 700 to another computing device 702. Both computing devices may be provided with the schema that defines how the process 102 is packaged for transfer, so that each computing device may perform the respective packaging and unpackaging. The process 102 may then be halted at the source computing device 700 and continued from the same point in execution at the destination computing device 702.

Figure 7B:
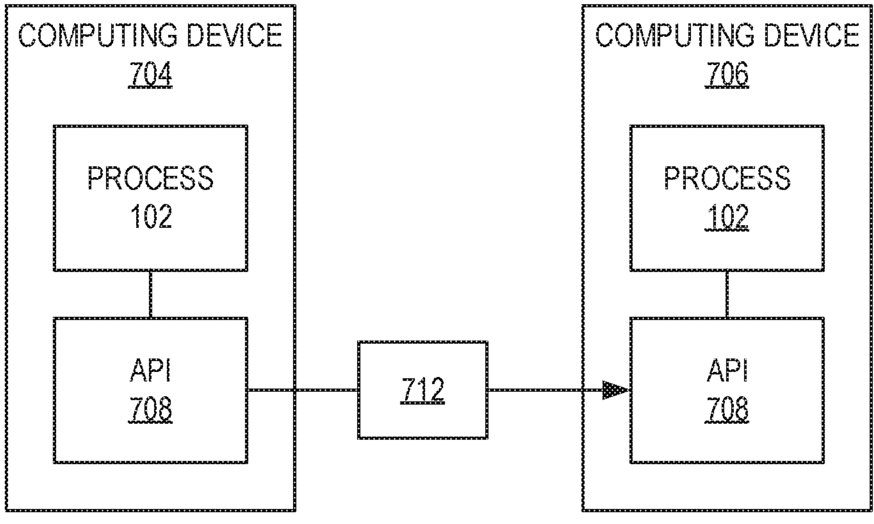
FIG. 7B is a schematic diagram of an example transfer of data of a process between computing devices.

With reference to FIG. 7B, data 712 of a process 102 may be transferred between computing devices 704, 706 that share an API 708 that facilitates such transfer. Data 712 may include memory content, files, and state related to execution of the process 102. The machine code of the process 102 is not transferred, but rather is independently executed at the computing devices 704, 706. The process 102 may communicate with the API 708 to facilitate the transfer of data 712 at both the source and destination computing devices 704, 706.

In view of the above, it should be apparent that execution of a process (or application) may be transferred between different computing devices, which may have different capacities and capabilities, with regard to user interaction and application focus, and thus user attention to the process. Transfer may be performed when the user is unlikely to notice. Transfer may be made to a computing device with resources that are better suited to the process. As such, the user may notice that the process is executed effectively without being aware that the process has been offloaded to another device.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A computing device comprising:
- a user input device;
- a network interface;
- a processor connected to the user input device and the network interface, the processor to:
  - execute a process;
  - monitor user input at the user input device to determine user interaction with the process; and
  - in response to (i) determining a lack of user interaction with the process and (ii) determining a portion of network bandwidth exceeds a first threshold or a portion of CPU cycles exceeds a second threshold, provide the process to a remote computing device via the network interface to continue execution of the process by the remote computing device.

2. The computing device of claim 1, wherein the processor is to transmit the process to the remote computing device via the network interface.

3. The computing device of claim 1, wherein the processor is to communicate data of the process to the remote computing device via the network interface and an application programming interface at the remote computing device.

4. The computing device of claim 1, wherein the processor is further to:
- receive output of the process from the remote computing device via the network interface; and
- open a new viewport to display the output received from the remote computing device.

5. The computing device of claim 4, wherein the processor is further to:
- open the new viewport at a display location of an existing viewport that is assigned to the process as executed by the processor; and
- close the existing viewport.

6. The computing device of claim 5, wherein the processor is further to determine that the process uses an excessive amount of resources of the computing device as a condition to provide the process to the remote computing device.

7. The computing device of claim 5, wherein the processor is to apply a machine-learning model to monitor the user input and determine a lack of user interaction with the process.

8. The computing device of claim 1, wherein the processor is to prompt the user to confirm if the user is interacting with the process.

9. The computing device of claim 8, wherein a lack of response to the prompting indicates the user is not interacting with the process.

10. The computing device of claim 1, wherein, to monitor the user input at the user input device to determine user interaction with the process, the processor monitors at least one of:
- mouse clicks;
- camera image capture;
- camera video capture; or
- microphone audio capture.

11. A non-transitory computer-readable medium comprising instructions that cause a processor to:
- monitor for focus of an application executed by the processor;
- when the application loses focus, and in response to determining a portion of network bandwidth exceeds a threshold, provide process of the application to a computing device that is remote from the processor to continue execution of the application by the remote computing device; and
- receive output of the application from the remote computing device.

12. The non-transitory computer-readable medium of claim 11, wherein the instructions are further to replace output of the application as executed by the processor with the output received from the remote computing device.

13. The non-transitory computer-readable medium of claim 11, wherein the instructions are to initiate a subsequent execution of the application at the remote computing device without monitoring the user focus for user inattention.

14. The non-transitory computer-readable medium of claim 11, wherein the instructions are to determine a target resource allocation for the application and select the remote computing device from a plurality of the remote computing devices based on the target resource allocation.

15. A method comprising:
- initiating local execution of a process at a local computing device;
- in response to determining that local execution consumes an unacceptable amount of local computational resources and that the process lacks focus, transferring execution of the process to a remote computing device that includes greater computational resources than the local computing device for remote execution of the process, wherein the unacceptable amount of local computational resources occurs when a portion of CPU cycles exceeds a threshold; and outputting results of the remote execution of the process at the local computing device.

16. The method of claim 15, further comprising:

returning execution of the process to the local computing device in response to determining that local execution would consume an acceptable amount of local computational resources;

opening a new viewport of the local execution of the process at a display location of an existing viewport of the remote execution of the process; and closing the existing viewport.

17. The method of claim 15, further comprising returning execution of the process to the local computing device in response to an increase in latency in a computer network that connects the local computing device and the remote computing device.

18. The method of claim 15, further comprising applying a plurality of different focus indicators to a machine-learning model to determine that the process lacks focus.

* * * * *